J. W. PEPLINSKI.
CUT-OFF DEVICE FOR FLUID FUEL BURNERS.
APPLICATION FILED JAN. 17, 1910. RENEWED FEB. 19, 1912.
1,039,793.
Patented Oct. 1, 1912.
SHEETS—SHEET 1.
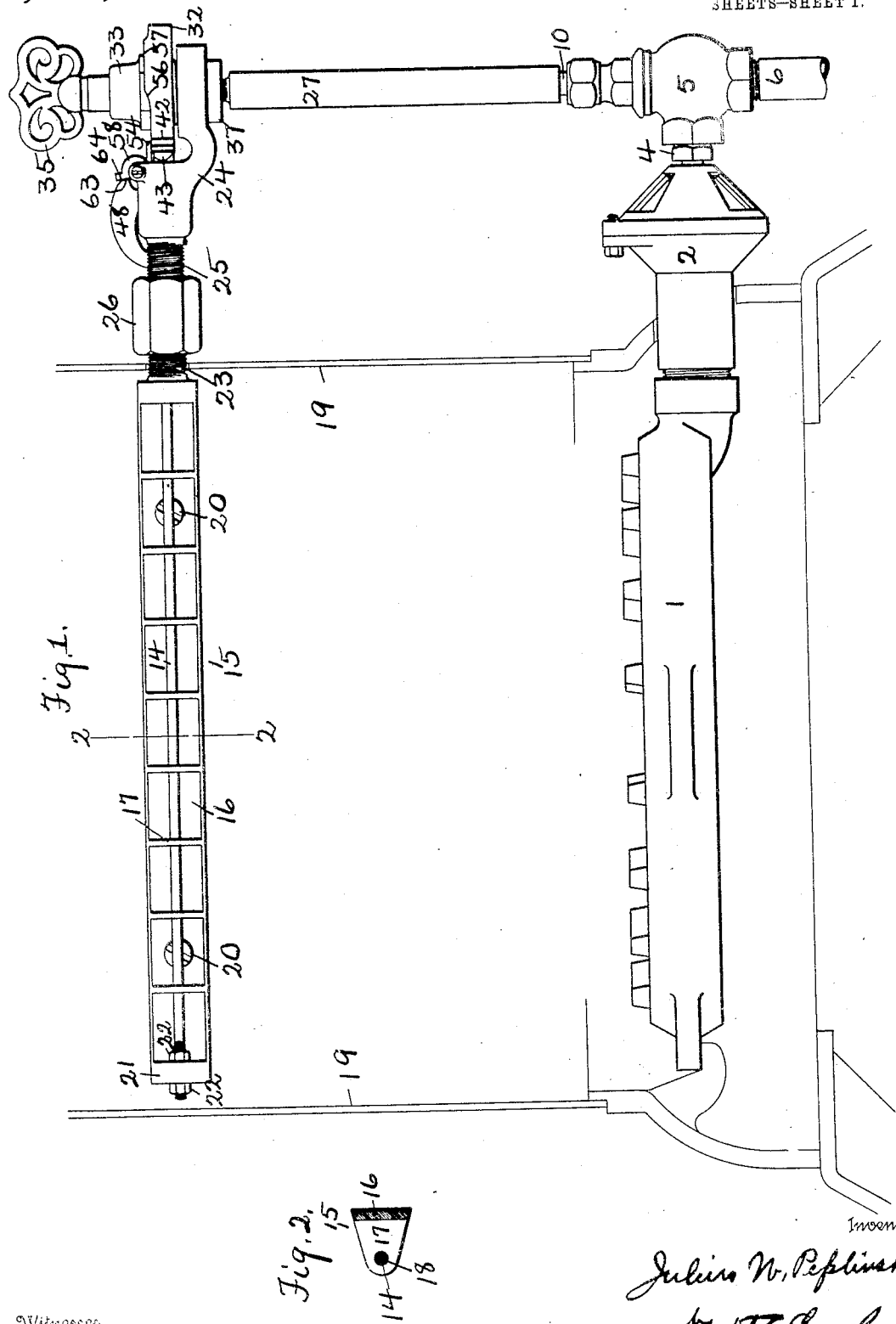

J. W. PEPLINSKI.
CUT-OFF DEVICE FOR FLUID FUEL BURNERS.
APPLICATION FILED JAN. 17, 1910. RENEWED FEB. 19, 1912.
1,039,793.
Patented Oct. 1, 1912.
2 SHEETS—SHEET 2.
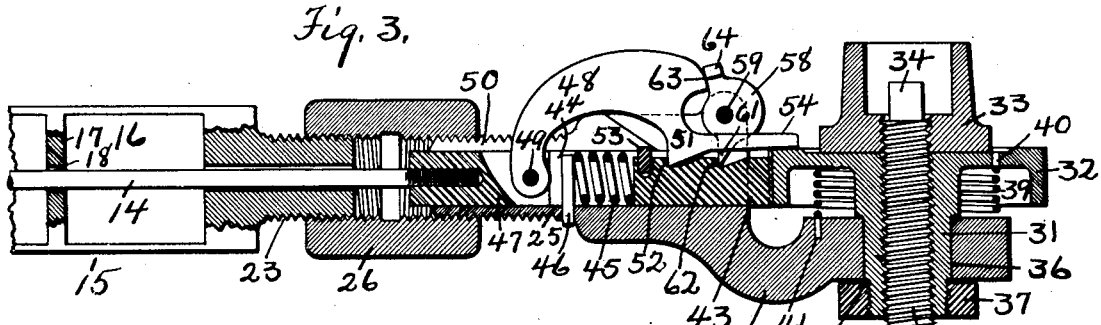
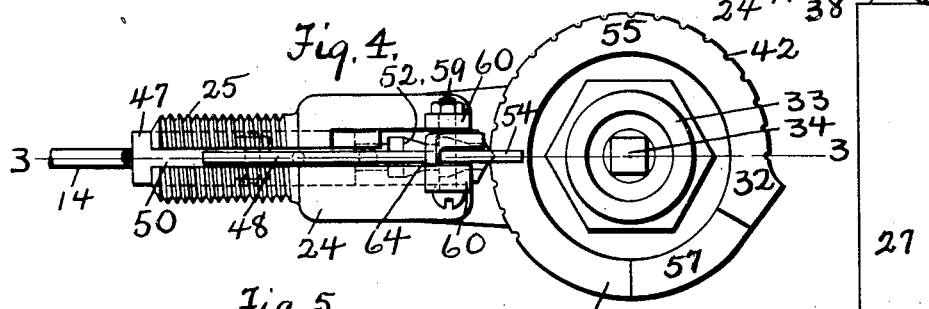
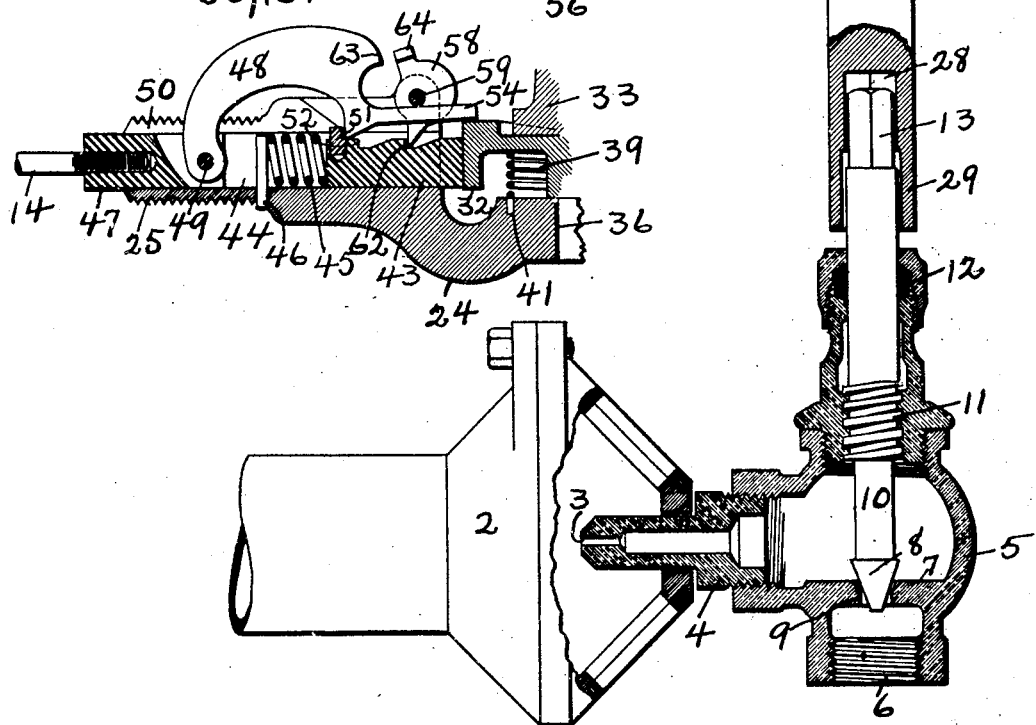

UNITED STATES PATENT OFFICE.

JULIUS W. PEPLINSKI, OF ERIE, PENNSYLVANIA, ASSIGNOR TO SECURITY SAVINGS AND TRUST CO., TRUSTEE, OF ERIE, PENNSYLVANIA, A CORPORATION OF PENNSYLVANIA.

CUT-OFF DEVICE FOR FLUID-FUEL BURNERS.

1,039,793. Specification of Letters Patent. Patented Oct. 1, 1912.

Application filed January 17, 1910, Serial No. 538,391. Renewed February 19, 1912. Serial No. 678,747.

*To all whom it may concern:*

Be it known that I, JULIUS W. PEPLINSKI, a citizen of the United States, residing at Erie, county of Erie, and State of Pennsylvania, have invented Cut-Off Devices for Fluid-Fuel Burners, of which the following is a specification.

This invention relates to cut-off devices for fluid fuel burners, and consists in certain improvements in the construction thereof as will be hereinafter fully described and pointed out in the claims.

In the burning of fluid fuel, especially gas, it very often happens that the pressure of gas in the line is reduced to such an extent as to extinguish the fire at the burner, and it also happens that the pressure increases to such an extent as to result in improper combustion, and the passage of partially consumed gas which is very dangerous.

The object of this invention in its broader aspects is to provide against these contingencies. In the broader aspects as to some of the features of the invention, it is applicable to one of these disadvantages, that is, the reduction or increase of the gas pressure alone.

In carrying out my invention I have utilized an ordinary controller valve so that the gas may be turned on or off without any especial care on the part of the operator. The mechanisms for the safety devices work automatically, so that they are disengaged and thrown into engagement without any attention on the part of the operator.

The invention is illustrated in the accompanying drawings as follows:—

Figure 1 is an elevation of a burner with the safety device in place thereon; Fig. 2 a section on the line 2—2 in Fig. 1; Fig. 3 is a central section through the device on the line 3—3 in Fig. 4; Fig. 4 is a plan view of the valve; Fig. 5 is a section similar to Fig. 3 but with the parts disengaged or in the position assumed when the controlling valve is closed.

1 marks the burner, 2 the mixer. These are of ordinary construction. A jet 3 extends into the mixer. This is carried in the fitting 4. The fitting 4 is screwed into the discharge end of the gas controlling valve 5. This is the ordinary angle valve used on stoves for this purpose; it has the inlet 6; diaphragm 7; needle valve 8 operating in the opening 9; and the stem 10 having the screw 11 and extending through the gland 12 and provided with the squared end 13.

The thermostatic element 14 is carried by a guide 15 and is arranged above the burner in position to receive heat from the fire at the burner. The guide is formed by a plate 16 on which are a series of ears 17 having perforations 18 in alinement. These form a loose fit on the element 14. They therefore maintain the alinement of the element without interfering with its play lengthwise. The guide is secured to the stove 19 by screws 20. The end of the element is screw threaded and extends through the ear 21. Nuts 22—22 are arranged on the element at each side of the ear, thus locking the end of the rod to the end of the guide.

The end of guide next the valve has the screw threads 23. A trip mechanism frame 24 is also provided with screw threads 25 preferably of a pitch in a different direction than the threads 23. A turn-buckle 26 is arranged on these screw threads. The trip mechanism frame is thus supported and nice means of adjustment is provided between the thermostatic element and the trip mechanism hereinafter described.

An extension 27 is arranged on the valve stem. It has the squared socket 28 engaging the squared end 13. The extension preferably extends below the squared end, the socket 29 permitting, so that the end may rest on the valve if desired. The upper end of the extension has the screw thread 30 which is screwed into the hub 31 of the locking plate 32. A socketed nut 33 is screwed onto the upper end of the stem forming a jam nut for locking the locking plate in place on the extension. The upper end of the extension is squared at 34 to receive the usual key 35 by means of which the valve may be manually actuated at all times to either open or close.

The hub 31 is mounted in a bearing 36 in the trip mechanism frame. A nut 37 is screwed onto the lower end of the hub against the shoulder 38 thus securing the hub in the bearing yet leaving it free to rotate therein.

A spring 39 is arranged in a cavity on the under side of the locking plate 32. One end of the spring extends into the perforation 40 in the plate and the other end of the spring extends into the perforation 41 in the frame, thus one end of the spring is locked to the plate and the other to the frame. The spring is of sufficient strength and is tensioned to close the valve when the locking plate is released by rotating the plate and with it the extension and stem.

The locking disk has a series of notches 42 on its periphery into which a locking pawl 43 extends. The pawl is carried in a groove 44 in the trip mechanism frame and is forced forward by a spring 45 arranged between the end of the pawl and the pin 46 secured to the frame and extending into the groove. The end of the pawl is so shaped with relation to the notches 42 as to lock the disk against the energy exerted by the spring 39 but still permitting of the ready turning of the disk, to open or close the valve manually.

The thermostatic element on rod 14 is screwed into a slide 47 operating in the groove 44. The slide is slotted at its point end and a connecting pawl 48 is pivotally secured in the end of the slide by the pin 49. The pawl 48 extends through a slot 50 in the frame above the groove. The pawl has the catch 51 adapted to engage a shoulder 52 on the locking pawl 43 when the thermostatic element is expanded by a normal heat. A pin 53 extends from the pawl 43 into the slot 50 to keep the pawl 43 from turning in the groove.

A trip finger 54 extends from the front end of the connecting pawl 48 and rides upon the face 55 of the locking disk or plate 32. A cam 56 is arranged at the end of this face 55. Just prior to the closing of the valve and after the last notch 42 has passed the pawl 43 in the closing movement the cam 56 passes under the finger 54 and lifts the pawl 48 and the catch 51 above the shoulder 52 so that with the contraction of the thermostatic element the pawl remains in position to lock the plate when the valve is again opened. In order to allow for wear and inaccuracies of adjustment the cam is followed by the raised surface 57 so that the finger is maintained in the elevated position as the cam moves past the finger with the movement completing the closing of the valve.

The parts are initially in the position shown in Fig. 5. To light the fire the valve is manually operated, the pawl 43 locking the valve in any adjustment desired. As the thermostatic element expands under the influence of the heat it pushes the slide 47 and connecting pawl 48 into the position shown in Fig. 3 the catch 51 dropping in front of the shoulder 52 in position to withdraw the pawl 43 should the temperature fall below the normal without the manual closing of the valve. This automatic closing of the valve moves the cam 56 under the finger 54 and raises the pawl 48 so that when the valve is again opened, the pawl 43 will be free to lock it in the open position. The operator therefore simply operates the valve in the usual manner and the pawl holds it in adjustment and trip mechanism is automatically thrown into and out of engagement.

As hereto stated it is desirable to have the thermostat operate not only when the fire is extinguished but also when the fuel pressure increases above the safety point. This, of course, is accompanied ordinarily by increase of temperature of the fire, and this is utilized for closing the valve. A reversing pawl 58 is mounted on the pin 59 extending between the ears 60, the ears being formed with the frame. The reversing pawl has a catch finger 61 which engages the hook 62 on the pawl 43. The pawl 48 has a shoulder 63 in position to engage an arm 64 on the upper end of the pawl 58, the parts when the thermostatic element is normally expanded being as shown in Fig. 3. When the thermostatic element expands beyond this normal position, the slide 47 is moved toward the trip mechanism carrying with it the pawl 48. The shoulder 63 engaging the arm 64 forces the upper end of the reversing pawl toward the right, and the catch finger 61 in the reverse direction, and thus operating upon the hook or shoulder 62, forces the pawl 43 out of engagement with the locking disk, thus closing the valve. The cam 56 of course operates in either instance to lift the pawl 48 so as to permit of the contraction of the thermostatic element as the fire is extinguished. It will be seen therefore that with this construction the valve is manually operated in either direction so that the operator simply goes through the usual movement of opening and closing the valve, the thermostatic element automatically taking up the trip devices and automatically disengaging therefrom. It will also be seen very readily that the thermostatic element once in engagement will trip the valve thus insuring safety against an increase or a decrease in pressure. The arrangement of the trip mechanism at the level of the thermostatic element permits of direct connection between the thermostatic element and the devices operating the valve.

What I claim as new is:

1. The combination of a burner, a valve which controls the flow of fluid to the burner, a motor for closing the valve, means automatically actuated for locking the valve against movement through the energy of the motor, a thermostatic element that is subjected to the heat from the burner and a device actuated by the movement of the thermostatic element from variations in temperature in either direction to unlock the valve to shut off the flow of the fluid.

2. The combination of a burner, a manually operative valve controlling the flow of fuel to the burner, a thermostatic element which is subjected to the heat from the burner, a motor for closing the valve, a pawl for locking the valve against closing, devices acting with a movement of the thermostatic element through variations in temperature in either direction for withdrawing the pawl to unlock the valve and to shut off the flow of the fluid.

3. The combination of a fuel controlling valve, a thermostatic element, a motor for actuating the valve, a pawl for locking the valve in an open position, devices connecting the pawl with the thermostatic element comprising a reversing mechanism which will convey the movement of the thermostatic element to the pawl and reverse the direction of the movement, and a mechanism connecting the thermostatic element with the pawl which will move the pawl in the direction of the movement of the thermostatic element.

4. The combination of a burner, a valve controlling the flow of fluid to the burner, a thermostatic element that is subjected to heat from the burner, a motor for closing the valve, a pawl for locking the valve in open position, devices actuated by the thermostatic element for conveying the action of the thermostatic element to the pawl to withdraw the pawl with a movement of the thermostatic element in either direction, said devices being initially disconnected and being thrown into connection by the action of the thermostatic element under normal heat from the burner, and acting on the pawl to move the pawl to a position to unlock the valve to shut off the flow of fluid as the temperature of the thermostatic element is reduced below the normal only with a pre-determined low temperature of the element.

5. The combination of a fuel controlling valve, a motor for actuating said valve, a locking plate connected and moving with the valve, a cam on the locking plate, a locking pawl acting on the locking plate to lock the valve in different positions varying the opening of the valve, a thermostatic element, a connecting pawl between the locking pawl and the thermostatic element for conveying the movement of the thermostatic element in one direction to the locking pawl, said connecting pawl being adapted to be thrown out of engagement with said locking pawl by said cam as the controlling valve is closed, and devices acting upon the locking pawl and actuated by the thermostatic element for releasing the locking pawl when the thermostatic element moves in the opposite direction.

6. The combination of a fuel controlling valve, a trip mechanism frame with a pawl groove therein, a slot leading to said groove, a motor for actuating the valve, a locking plate carried by the frame and actuated by the motor and connected with the valve, a cam on the locking plate, a locking pawl arranged in the groove, and operating upon the locking plate, a spring in the groove operating upon the pawl, a thermostatic element, a slide on the thermostatic element arranged in the groove, a connecting pawl mounted on the slide extending through the slot, and acting upon the locking pawl, and in position to be thrown out of engagement with the locking pawl by said cam, a reversing pawl pivotally mounted on the frame having one end operating upon the locking pawl and the opposite end actuated by the connecting pawl whereby the connecting pawl is thrown into engagement with the locking pawl in a normal expansion of the thermostatic element, withdraws the said locking pawl upon the contraction of the thermostatic element without the prior closing of the valve, is thrown out of engagement with the locking pawl by the cam when the valve is closed, and operates upon the reversing pawl to withdraw the locking pawl when the thermostatic element is expanded beyond the normal.

7. In a cut-off device for fuel burners, the combination of a burner, a valve controlling the flow of fuel to the burner, mechanism actuating the valve, a thermostatic element controlling the valve actuating mechanism and a guide of different expansive quality than the element supporting the element against lateral distortion at points along the element subjected to heat and allowing a free longitudinal movement of the end of the element the more remote from the valve actuating mechanism, the element being secured to one end of the guide and the opposite end of the guide being secured to the valve actuating mechanism.

8. The combination of a burner a thermostatic element in position to receive the heat from the burner, and a guide for said element comprising a plate with a series of ears having perforation in alinement through which a portion of the element subjected to heat extends, the element being secured at one end to the guide, and devices actuated by the element connected to the opposite end of the guide.

In testimony whereof I have hereunto set my hand in the presence of two subscribing witnesses.

JULIUS W. PEPLINSKI.

Witnesses:
I. A. CASSIDY,
H. C. LORD.